Figure 1:
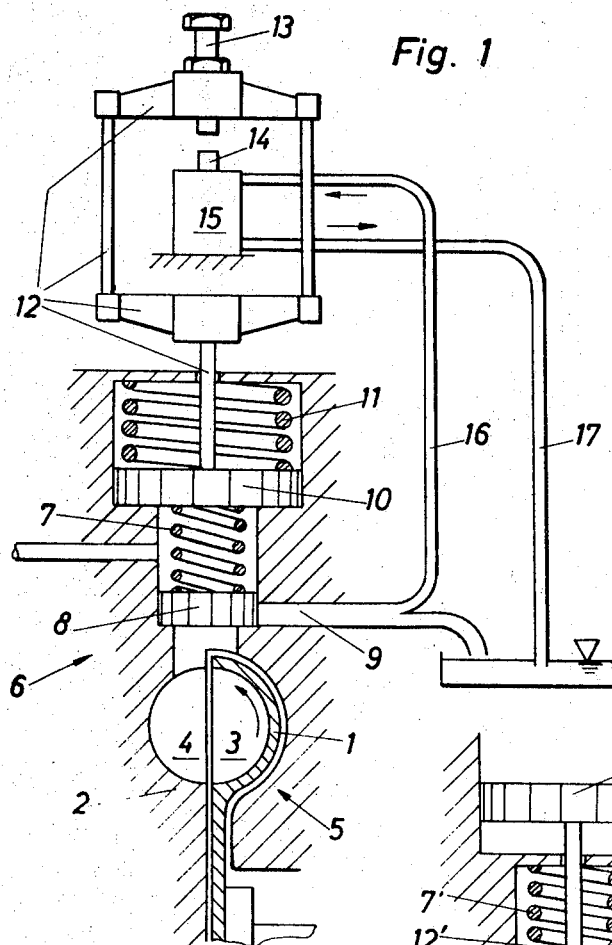

United States Patent

[11] 3,542,168

[72] Inventor Helmut Muller
 Heidenheim, Germany
[21] Appl. No. 771,589
[22] Filed Oct. 29, 1968
[45] Patented Nov. 24, 1970
[73] Assignee Voith Getriebe KG
 Heidenheim (Brenz), Germany
[32] Priority Nov. 9, 1967
[33] Germany
[31] No. 1,655,644

[54] HYDRODYNAMIC BRAKE WITH POWER LIMITATION
 5 Claims, 2 Drawing Figs.
[52] U.S. Cl. .................................................. 188/278
 188/264, 188/296, 188/274
[51] Int. Cl. .................................................... F16d 57/02

[50] Field of Search ............................................. 188/90,
 90A, 264, 264.2, 264.25

[56] References Cited
 UNITED STATES PATENTS
 1,610,830 12/1926 Walker.......................... 188/90(A)UX
 2,667,238 1/1954 Bennett......................... 188/90(A)UX Primary Examiner—George E. A. Halvosa
Attorney—Walter Becker ABSTRACT: A combined torque limitation and a temperature limitation of a working medium for a hydrodynamic brake to permit a maximum braking limitation. The working chamber of the brake is equipped with a spring loaded pressure valve in which the spring preload is reduced thermostatically with increasing temperature of the working medium.

Patented Nov. 24, 1970

3,542,168 temperature pressure measuring value transformer pressure relief valve

INVENTOR.
Helmut Müller
BY
Walter Becker

HYDRODYNAMIC BRAKE WITH POWER LIMITATION

The present invention relates to a hydrodynamic brake suitable especially for motor vehicles and equipped with a device for automatically limiting the maximum power required.

Hydrodynamic brakes convert kinetic energy by inner friction within the working fluid into heat which has to be carried away. If the unit to be braked is driven by a motor which requires a heat exchanger for carrying its lost energy away, for instance with a rail vehicle driven by an internal combustion engine, as a rule this motor cooling installation is also employed for carrying away the braking heat and is correspondingly designed with greater dimensions. It is merely necessary by means of a liquid-liquid-heat exchanger to convey the heat of the working medium of the brake to the cooling fluid of the motor. In view of the required temperature of operation of the motor cooling fluid, however, it is required that not any high amount of energy be conveyed form the brake per time unit into the cooling installation because otherwise the cooling water may be overheated with inherent damage to the motor. The possibility of such thermal overload of the motor cooling installation will become immediately apparent when considering the fact that with motor vehicles, as a rule, the hydrodynamic brakes must be so designed that they will be able, without difficulties, to convert 1.5 times the amount of the full motor power into heat. Consequently, with hydrodynamic braking installations, the heat exchanger of which feeds heat into a foreign cooling installation, it is necessary, in view of the requirements of this foreign cooling installation, to limit the power required. However, also with independent hydrodynamic braking installations equipped with a cooling installation of their own, it is necessary to prevent an overheating of the working medium in order not to impair the lubricating ability of the said working medium.

Devices for limiting the power required of the brake have heretofore become known. According to these known devices for limiting the power required of brakes, the braking power was determined by measuring the speed of the braking rotor and by measuring the braking moment, and this control factor was by means of a governor limited in upper direction, for instance by reducing the filling in the brake. The power limit obtained in this way is adjusted once and then remains at its respective adjustment. In view of high summer temperatures, soiling of the heat exchanger, etc., this power limit is selected sufficiently low.

Aside from the expense involved in such control mechanism, a device of this type has the drawback that the braking power remains fixed, even though over the major portion of the year, it would be possible, without danger, even over a longer period of operation, for instance, when driving downhill, to brake at a higher limit. Inasmuch as the total mass of the parts contacted by the cooling fluid and the working media, and since the mass of the cooling fluid, as well as the mass of the working medium itself, together have a considerable heat capacity, these parts are able, without dangerous increase in temperature, to absorb a relatively short heat shock as it is encountered when suddenly braking a vehicle while driving over a plain terrain. This means that with a retarding braking operation, a limitation of the power with regard to a thermal load of the installation is not necessary and merely cuts down the capacity of the installed brakes.

It is, therefore, the object of the present invention to provide a hydrodynamic brake with a power limitation which will overcome the above mentioned drawbacks. It is another object of this invention to provide a device as set forth in the preceding paragraph which, in order to make full use of the installed braking power is provided with variable power limitations.

These and other objects and advantages of the invention will appear more clearly from the following specification in connection with the accompanying drawing in which:

FIG. 1 diagrammatically illustrates, partially in section, a hydrodynamic brake according to the present invention with a braking power limiting valve.

Figure 2:
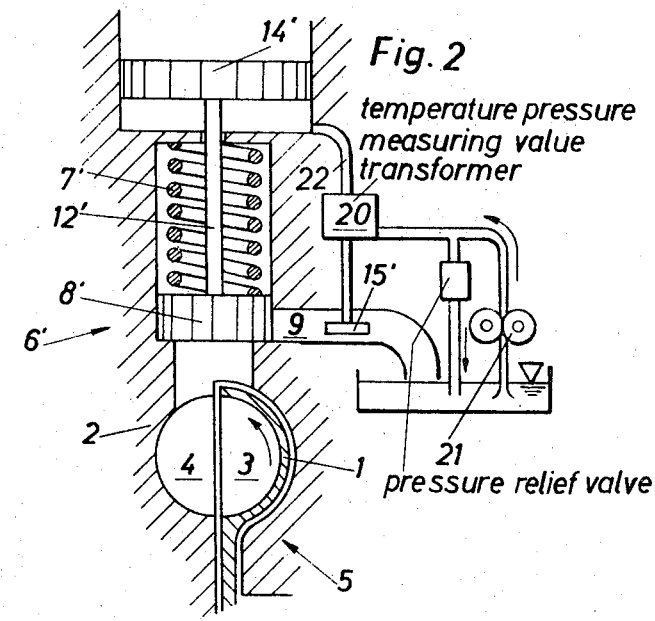

FIG. 2 shows the same brake as that illustrated in FIG. 1, but differs from FIG. 1 inasmuch as the braking power limiting valve is of a different design.

The hydrodynamic brake according to the present invention, in view of the strength of the gears between the brake and the axle to be braked, makes use of the braking moment, and in view of the lubricating ability of the working medium employs the temperature of the latter as a means for limiting the required power. The hydrodynamic brake according to the present invention is characterized by the combined employment of a limitation of the braking moment and of a temperature limitation of the working medium in such a way that the working chamber of the brake is equipped with a spring loaded pressure limiting valve, the spring of which has its preload reduced thermostatically with increasing temperature of the working medium. Advantageously, the mechanical coupling between the thermostat and the spring is so designed that reduction in the spring preload starts only from a certain adjustable temperature.

The invention is based on the assumption which is generally borne out by the face, at least approximately in the upper range of operation, that the torque of the hydrodynamic brake is with constant filling proportional to the pressure prevailing at the outer circumference of the torus shaped working chamber. This pressure is limited by valves. When the pressure in the working chamber becomes higher than permitted by the spring preload, in other words if the braking moment becomes too high, the working medium will displace the valve piston against the thrust of the spring until a new condition of equilibrium has been established, thereby opening up a cross section through which the filling of the working chamber of the brake will be reduced. In view of this reduction in the filling, the braking moment is reduced even though the filling pressure may stay at the increased value which brought about the reduction of the filling. In view of these steps, mechanical damage to the power transmitting elements between the braking rotor and the axle to be braked will be practically made impossible.

Since, when engaging the brake, first always the torque becomes effective in view of the engaged hydrodynamic brake, and the pressure at the outer circumference of the working chamber becomes effective, first, as the case may be, a corresponding control operation is initiated at the pressure limiting valve. This means that at the start of the braking operation, automatically the maximum permissible braking moment occurs. Only later a thermal action of the braking operation occurs. Depending on the duration and intensity of said thermal action, additionally to the effect of the pressure of the working medium, a temperature influence is conveyed to the valve piston. This influence acts with an increase in the temperature in opening direction, which means that the degree of filling of the coupling is reduced further. Due to the fact that the torque is limited in conformity with the heat up of the working medium, as a whole a limitation in the power is brought about.

Since the maximum permissible temperature of the working fluid, due to its simultaneous employment as a lubricant, is generally lower than the maximum permissible temperature of the cooling water of a possibly subsequent cooling circuit, the temperature of the working oil is the one which through the intervention of a thermostat acts upon the limiting valve. The limitation of the power of the brake by means of the heated up working fluid brings about a movable or variable power limitation since in view of the device according to the invention, more braking heat is carried away in winter than is during summer time, without unduly exceeding a permissible temperature. The temperature, the proper reason for a power limitation has by the present invention obtained its proper importance and has been made use of as a controlling factor in connection with the power limitation.

For purposes of compensating the deviation of the linear connection between braking moment and pressure at the outer circumference of the working chamber or for purposes of introducing another interdependence, it is suggested according to a further development of the present invention, that in addition to the spring preload, a further preloading force acts upon the control piston of the pressure limiting valve, especially a pressure force which varies according to a certain law with the speed of the braking rotor. Expediently, the spring preload of the pressure limiting valve is, when a reduction becomes necessary, in view of a temperature defect reduced hydrostatically, for instance, through an auxiliary piston, while the pressure for actuating said auxiliary piston is made available by means of a temperature-pressure measured value transformer with hydrostatic supply of auxiliary energy.

Referring now to the drawing, corresponding parts in FIGS. 1 and 2 are provided with the same reference numerals whereas similar parts to those of FIG. 1 have been additionally provided with a prime.

Specifically referring to the drawing, the hydrodynamic brake 5 illustrated therein has a rotor 1 and a stator 2, both being equipped with a blade ring 3 and 4 respectively which together form the torus shaped working chamber 3, 4 of the brake 5. The outer circumference of the working chamber of the brake is equipped with a pressure limiting valve 6 in FIG. 1 and with a pressure limiting valve 6' in FIG. 2.

The limiting valve according to FIG. 1 comprises a controlled piston 8 which is under the load of a preloading spring 7. When the valve is in rest position, the piston 8 closes the overflow conduit 9. When the pressure increases in the working chamber beyond the value determined by the spring preload, the piston 8 leaves its rest position and regains a new equilibrium in a position somewhat further back. In this way, the piston 8 frees a certain portion of the cross section of the conduit 9 and through this free portion the degree of filling of the brake can be reduced and at a lower value can find its new state of rest or inertia.

The magnitude of the degree of filling of the brake 5 and thus of the braking moment in conformity with the pressure at the outer circumference of the working chamber 3, 4 is determined by the preload of the spring 7. This spring rests on a second piston 10 which in its turn is held in an end position by a spring 11 which is stronger than the spring 7. A push rod 14 of a wax thermostat 15 acts upon said piston 10 through the intervention of a linkage means 12 and an adjusting screw 13. Thermostat 15 is through conduit 16 and 17 brought to the temperature of the flowing off working fluid. The higher the temperature of the oil becomes, the farther will the wax push the push rod 14 out of the thermostat 15. At a certain temperature, the push rod 14 will engage the lower end of the adjusting screw 13. As the temperature increases still further, the piston 10 will be lifted against the thrust of the spring 11. In this way the preload of the spring 7 is reduced. This means that at the same pressure in the working chamber, the overflow cross section in conduit 9 will be increased, and the degree of filling and thereby the braking power will be decreased by the influence of the temperature.

With the limiting valve 6' according to FIG. 2, the influence of the temperature has been structurally made use of in a different way. The limiting valve 6' likewise comprises a piston 8' which is pressed by the force of the preloaded spring 7' into an end position in which the overflow conduit 9 is closed. By means of a piston rod 12', the piston 14' is connected to the piston 8'.

Interposed in the overflow conduit 9 is a thermostat 15' which acts upon a temperature-pressure measuring value transformer 20. Said transformer 20 is supplied with pressure by the gear pump 21. In the conduit 22 which leads from the transformer 20 to the pressure chamber of the piston 14', a fluid pressure prevails always which is proportional to the oil temperature. This proportionality, however, prevails only above a certain temperature. Below said temperature the conduit 22 is without pressure. If the oil reaches a temperature in the said range of proportionality, the piston 14' is lifted and opens an overflow cross section in conduit 9 whereby the degree of filling of the brake is reduced. Consequently, the braking moment is reduced. Since at the same speed of the braking rotor the power transformed by the brake decreases, also the temperature of the working medium drops as long as care has been taken for a sufficient flow of the working medium through the brake. Said temperature-pressure measuring value transformers are well known in the art and are disclosed, for instance, in French Pat. No. 1,537,518.

The advantages of the brake according to the present invention are seen in the simplicity of the limiting devices and above all in the movability or variation of the power limit. As a result thereof, it is not necessary to maintain a safety distance from the maximum permissible power limit with regard to the temperature of the cooling water and the oil. Instead, the installed power can be taken advantage of to its full extent. During winter time at high cooling capacity, the admissible braking power is higher than in summer time. With a retarded braking operation over a short period of time, a considerably higher braking power is possible than, for instance, with a downhill drive over a longer period of time.

It is, of course, to be understood that the present invention is, by no means, limited to the specific constructions shown in the drawings, but also comprises modification within the scope of the disclosure.

I claim:

1. A hydrodynamic brake system operable automatically to limit the maximum permissible braking power absorption by a brake, especially for vehicles, which includes: a fluid flow machine having working fluid receiving chamber means and forming a hydrodynamic brake, discharge conduit means adapted to communicate with said chamber means for discharging fluid therefrom, limiting valve means interposed between said chamber means and said discharge conduit means for controlling fluid communication therebetween, preloaded spring means associated with said valve means and continuously urging the same to move in the direction for interrupting said fluid communication, thermostatic means operatively connected to said preloaded spring means and operable to control the latter in conformity with the temperature of the fluid permitted by said valve means to flow from said chamber means to said conduit means, said fluid flow machine having a stator and a rotor together forming a working fluid receiving chamber, said valve means having a control piston acted upon by said preloaded spring means and controlling the passage of fluid from said chamber means to said conduit means, said valve means also having a preloading piston with an auxiliary spring acting upon said preloaded spring means for controlling the preload thereof in conformity with a pressure force varying according to the speed of said rotor, and an additional hydraulic system comprising a pressure fluid source and a pressure-temperature value transformer, said additional hydraulic system being operable to act upon said auxiliary piston in a direction to move said valve means in the direction opening said discharge conduit means upon sufficient pressure in said conduit means.

2. Hydrodynamic brake system operable automatically to limit the maximum permissible braking power absorption by a brake, especially for vehicles, which includes: a fluid flow machine having torus shaped fluid receiving working chamber means and forming a hydrodynamic brake, discharge conduit means adapted to communicate with said chamber means for discharging fluid therefrom, limiting valve means arranged at the outer circumference of said torus shaped working chamber means and interposed between said working chamber means and said discharge conduit means for controlling fluid communication therebetween, said limiting valve means having a control piston acted upon in opening sense by pressure at the outer circumference of said working chamber means, preloaded spring means associated with said control piston of said valve means and continuously urging the said control piston to move in the direction for interrupting said fluid communication, said preloaded spring means resting on a point which is movable to control continuously the preload of said preloaded spring means, and thermostatic means operatively connected to said point with respect to said preloaded spring means and operable to release said preloaded spring means in conformity with increase of the temperature of the fluid permitted by said valve means to flow from said chamber means to said conduit means.

3. A brake system according to claim 2, in which said thermostatic means is adapted to be adjusted so as only at a selected variable temperature of the fluid in said conduit means to act upon said point with respect to said preloaded spring means in the direction of reducing the preload thereof.

4. A brake system according to claim 2, in which said control piston also has a chamber arranged on the one side thereof upon which the said preloaded spring means are effectively acting, said chamber being adapted to contain liquid under pressure for controlling the preload of said control piston in conformity with a pressure force varying also according to the speed of rotative movement.

5. A brake system according to claim 2, which includes an additional hydraulic system, comprising a pressure fluid source and a pressure-temperature value transformer, and an auxiliary piston connected to said movable point, said additional hydraulic system being operable to act upon said auxiliary piston in a direction to move said movable point in the direction opening said discharge conduit means upon sufficient pressure in said conduit means.